W. A. Clark.
Auger.

No. 93,808. Patented Aug. 17, 1869.

Witnesses
J. H. Shumway
A. J. Tibbits

W. A. Clark
Inventor
By his Attorney
John E. Earl

United States Patent Office.

WILLIAM A. CLARK, OF WOODBRIDGE, CONNECTICUT.

Letters Patent No. 93,808, dated August 17, 1869.

IMPROVEMENT IN HOLLOW AUGER.

The Schedule referred to in these Letters Patent and making part of the same.

*To all whom it may concern:*

Be it known that I, WILLIAM A. CLARK, of Woodbridge, in the county of New Haven, and State of Connecticut, have invented a new Improvement in Hollow Augers; and I do hereby declare the following, when taken in connection with the accompanying drawings, and the letters of reference marked thereon, to be a full, clear, and exact description of the same, and which said drawings constitute part of this specification, and represent, in—

Figure 1:
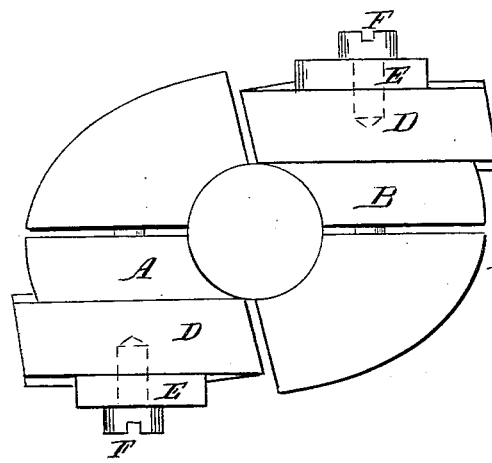
Figure 2:
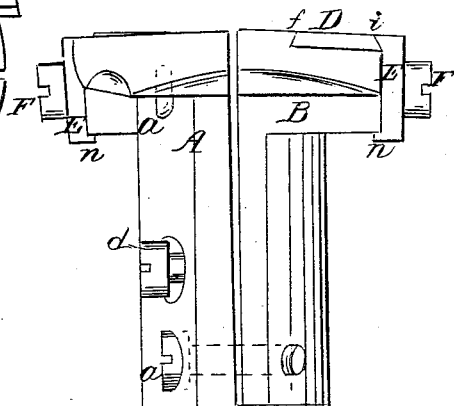

Figure 1, a view of the cutting-end;

Figure 2, a side view; and in

Figure 3:
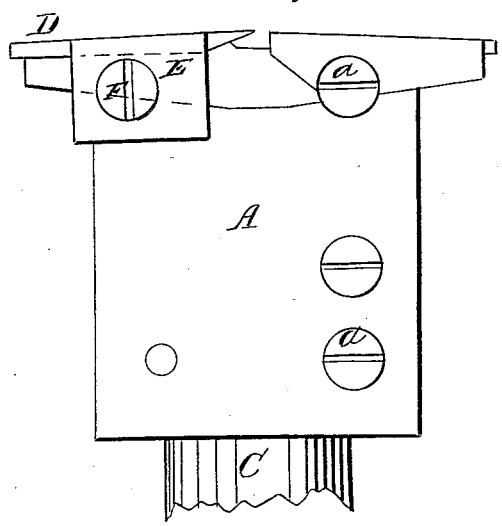
Figure 3:
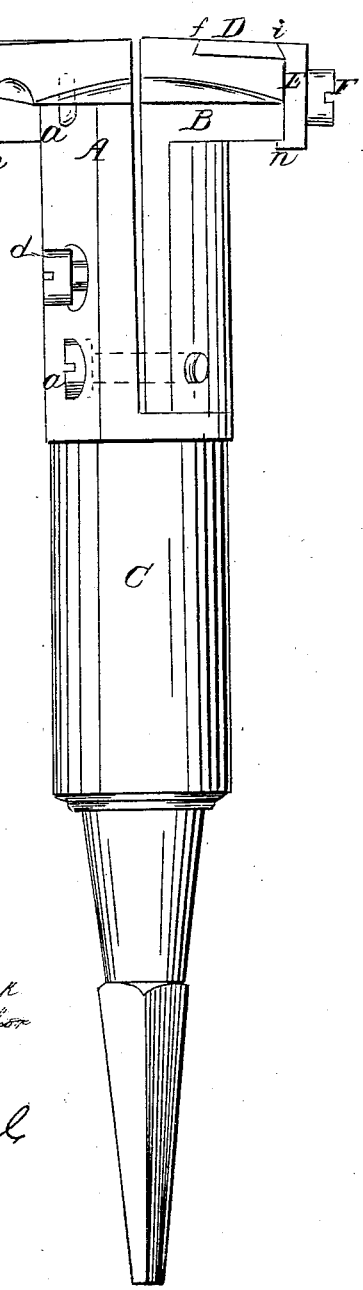

Figure 3, a view turned one-fourth around from fig. 2.

This invention relates to an improvement in hollow augers, such as are commonly used for boring round tenons, as, for instance, the outer end of carriage-spokes, the object of the invention being a more perfect security of the cutter than has heretofore been done.

The improvement, as here shown, is made in the adjustable auger for which Letters Patent were granted to me, bearing date June 12, 1860, wherein the two parts, each holding one of the cutters, are adjusted to or from each other, so as to retain a parallel position of the two parts of the head.

The invention consists in forming a dovetail groove in the respective head, to receive one edge of the cutter, and combining therewith, upon the outer edge, a dovetail clamp, in such manner that the cutter is firmly secured in its position.

To enable others skilled in the art to make and use my invention, I will proceed to describe the same as illustrated in the accompanying drawings.

A is one part, and B, the other part, of a cutter-head, the part A being formed upon a shank, C, and the other part adjustable thereon, so as to be moved to or from the part A, and retained in a parallel position by set-screws $a$ $a$ and the adjusting-screw $d$.

The cutters D D are both similarly fixed.

A groove is formed in the head, as seen at $f$, fig. 2, into which one edge of the cutter fits.

The outer edge of the cutter is bevelled in like manner as the inner, and over this a clamp, E, is placed, its upper edge of dovetail form, so as to fit over the edge of the cutter, as seen at $i$, fig. 2.

The said clamp extends down, so as to clasp under the head, as seen at $n$, fig. 2; then through the clamp, into the head, a screw, F, is placed, so as to bind the clamp hard down upon the cutter, the bevelled edge of the clamp serving to draw the cutter down upon its seat.

By this arrangement, the lip $n$, on the clamp, takes the principal portion of the strain, so that the screw F is greatly relieved, as the tendency of the strain upon the cutter is to throw up the cutter, which, were it not for the lip $n$, would come directly upon the screw.

By this arrangement, the cutters are easily adjusted or removed, by simply loosening the screw F, and the cutters may be formed in a bar and cut off at the required length, thus making the construction of the cutter but a trifling cost.

The advantages of this manner of adjustment over the head, slotted to receive the cutters, as heretofore constructed, are too apparent to require further statement in this description.

Having fully described my invention,

What I claim as new and useful, and desire to secure by Letters Patent, is—

In combination with the cutters D, the clamp E, constructed so as to grasp the head of the auger and edge of the cutter, substantially in the manner and for the purpose herein set forth.

WM. A. CLARK.

Witnesses:
  A. J. TIBBITS,
  J. H. SHUMWAY.